(12) United States Patent
Hu et al.

(10) Patent No.: US 11,787,748 B2
(45) Date of Patent: Oct. 17, 2023

(54) POLYPHOSPHORIC ACID CALCIUM MAGNESIUM FERTILIZER, POLYPHOSPHORIC ACID CALCIUM MAGNESIUM FERTILIZER PREPARED BY USING PHOSPHORIC ACID AND PHOSPHORUS TAILINGS AS RAW MATERIAL AND PREPARATION METHOD THEREFOR

(71) Applicants: KINGENTA ECOLOGICAL ENGINEERING GROUP CO., LTD., Shandong (CN); KINGENTA NORSTERRA CHEMICAL CO., LTD., Guizhou (CN); YUNNAN ZHONGZHENG CHEMICAL INDUSTRY CO., LTD., Yunnan (CN)

(72) Inventors: Zhaoping Hu, Shandong (CN); Yongxiu Liu, Shandong (CN); Jianguo Zheng, Shandong (CN); Botong Wang, Shandong (CN); Chengzhi Li, Shandong (CN); Nanshu Yu, Shandong (CN); Zongduan Guo, Shandong (CN); Shanming Hu, Shandong (CN)

(73) Assignees: KINGENTA ECOLOGICAL ENGINEERING GROUP CO., LTD., Shandong (CN); KINGENTA NORSTERRA CHEMICAL CO., LTD., Guizhou (CN); YUNNAN ZHONGZHENG CHEMICAL INDUSTRY CO., LTD., Yunnan (CN)

( * ) Notice: Subject to any disclaimer, the term of this patent is extended or adjusted under 35 U.S.C. 154(b) by 141 days.

(21) Appl. No.: 17/043,752

(22) PCT Filed: Mar. 21, 2019

(86) PCT No.: PCT/CN2019/079027
§ 371 (c)(1),
(2) Date: Sep. 30, 2020

(87) PCT Pub. No.: WO2019/192328
PCT Pub. Date: Oct. 10, 2019

(65) Prior Publication Data
US 2021/0032173 A1  Feb. 4, 2021

(30) Foreign Application Priority Data

Apr. 2, 2018 (CN) .......................... 201810281139.6

(51) Int. Cl.
*C05B 13/06* (2006.01)
*C05D 3/02* (2006.01)
*C05D 5/00* (2006.01)

(52) U.S. Cl.
CPC ................ *C05B 13/06* (2013.01); *C05D 3/02* (2013.01); *C05D 5/00* (2013.01)

(58) Field of Classification Search
CPC ......... C05B 13/06; C05B 13/02; C05B 17/00; C05D 3/02; C05D 5/00
See application file for complete search history.

(56) References Cited

U.S. PATENT DOCUMENTS

| 3,912,491 A | 10/1975 | Moore et al. | |
|---|---|---|---|
| 4,427,433 A * | 1/1984 | Parker ..................... | C05B 13/06 71/64.08 |
| 2013/0133387 A1 | 5/2013 | Varadachari | |
| 2013/0174624 A1 | 7/2013 | Sanders | |
| 2016/0002118 A1 | 1/2016 | Varadachari | |

FOREIGN PATENT DOCUMENTS

| CN | 101367673 A | 2/2009 |
|---|---|---|
| CN | 101618981 A | 1/2010 |
| CN | 102161602 A | 8/2011 |
| CN | 104496726 A | 4/2015 |

(Continued)

OTHER PUBLICATIONS

International Search Report for PCT/CN2019/079027 dated Jun. 3, 2019, ISA/CN.

(Continued)

*Primary Examiner* — Jennifer A Smith
(74) *Attorney, Agent, or Firm* — Yue (Robert) Xu; Apex Attorneys at Law, LLP

(57) ABSTRACT

The present invention relates to a polyphosphoric acid calcium magnesium fertilizer prepared by using phosphoric acid and phosphorus tailings as raw materials and a preparation method therefor. The polyphosphoric acid calcium magnesium fertilizer is prepared by using phosphorus tailings and phosphoric acid as raw materials. Based on $P_2O_5$, MgO and CaO, in the polyphosphoric acid calcium magnesium fertilizer: total phosphorus is 50-68%, effective phosphorus is 47-66%, total magnesium is 5-18%, effective magnesium is 4-15%, total calcium is 11-20%, effective calcium is 10-18%, and all are expressed in mass percentage. Based on $P_2O_5$, the polymerization rate of the polyphosphoric acid calcium magnesium fertilizer is ≥50%. The present invention also provides a preparation method for the fertilizer. The phosphorus in the product prepared by the invention has sustained-release properties. The fertilizer is well suited for crops requiring large amounts of calcium and magnesium.

7 Claims, No Drawings

(56) References Cited

FOREIGN PATENT DOCUMENTS

| | | | | |
|---|---|---|---|---|
| CN | 104829271 A | 8/2015 | | |
| CN | 105367357 A | 3/2016 | | |
| CN | 105481515 A | 4/2016 | | |
| CN | 106380231 A | 2/2017 | | |
| CN | 107628825 A | 1/2018 | | |
| CN | 108456007 A | 8/2018 | | |
| EP | 1992217 A1 | 11/2008 | | |
| EP | 2857376 A1 | 4/2015 | | |
| EP | 1992217 B1 * | 4/2017 | ........... | A01G 9/1086 |
| GB | 396092 A | 7/1933 | | |

OTHER PUBLICATIONS

First Office Action dated Sep. 1, 2020 for Chinese patent application No. 201810281139.6, English translation provided by Global Dossier.

Shuzi, Ye, "Discussion on the feasibility of developing POLI phosphate fertilizer in my country", Guangdong Fertilizer Chemical Mineral Industry Company, Fertilizer Industry, vol. 12, Issue 6, Dec. 15, 1985.

China Association for Science and Technology et al.,"2016-2017 Report on Advances in Mineral Processing Engineering Technology", China Science and Technology Press,Mar. 31, 2018, p. 259.

Partial search report dated Dec. 8, 2021 for European patent application No. 19782443.6.

Search Report dated Apr. 21, 2022 for European patent application No. 19782443.6.

* cited by examiner

POLYPHOSPHORIC ACID CALCIUM MAGNESIUM FERTILIZER, POLYPHOSPHORIC ACID CALCIUM MAGNESIUM FERTILIZER PREPARED BY USING PHOSPHORIC ACID AND PHOSPHORUS TAILINGS AS RAW MATERIAL AND PREPARATION METHOD THEREFOR

This application is the national phase of International Application No. PCT/CN2019/079027, titled "POLYPHOSPHORIC ACID CALCIUM MAGNESIUM FERTILIZER, POLYPHOSPHORIC ACID CALCIUM MAGNESIUM FERTILIZER PREPARED BY USING PHOSPHORIC ACID AND PHOSPHORUS TAILINGS AS RAW MATERIALS AND PREPARATION METHOD THEREFOR", filed on Mar. 21, 2019, which claims the priority of Chinese Patent Application No. 201810281139.6, titled "POLYPHOSPHORIC ACID CALCIUM MAGNESIUM FERTILIZER, POLYPHOSPHORIC ACID CALCIUM MAGNESIUM FERTILIZER PREPARED BY USING PHOSPHORIC ACID AND PHOSPHORUS TAILINGS AS RAW MATERIALS AND PREPARATION METHOD THEREFOR", filed on Apr. 2, 2018 with the China National Intellectual Property Administration, which is incorporated herein by reference in entirety.

FIELD

The present invention belongs to the technical field of chemical fertilizer production, and in particular, relates to a calcium magnesium polyphosphate fertilizer and a calcium magnesium polyphosphate fertilizer prepared by using phosphoric acid and phosphorus tailings as raw materials and preparation method therefor.

BACKGROUND

Phosphorus tailings are unutilized solid wastes that are discarded from floatation of concentrate in phosphate rocks. All the raw phosphate rocks in China are not high in grade, causing a discharge of massive phosphorus tailings during floatation of concentrate in phosphate rocks in the phosphorus chemical industry. For every 3 tons of phosphate rocks, 1 ton of phosphorus tailings will be discharged. Massive accumulation of the phosphorus tailings will not only take up a lot of land, but also cause environmental pollution. With the continuous development of phosphorus chemical industry and the increasing social needs in China, the problems resulting from accumulation of the phosphorus tailings becomes more and more serious.

At present, the phosphorus tailings in China are mainly used in the following aspects: first, the phosphorus tailings are used as raw materials for preparing building materials, such as cement, aerated concrete and glass ceramics. Although the above approach can consume a part of phosphorus tailings, and the massive accumulation of phosphorus tailings can be alleviated to a certain extent, the phosphorus tailings are not fully utilized, resulting in waste of some useful elements in phosphorus tailings. Second, the phosphorus tailings are subject to a secondary floatation. This method further utilizes the phosphorus in the phosphate tailings, which can effectively reduce the phosphorus content in the phosphate tailings, but the utilization rate of the phosphorus in phosphorus tailings is still low, and the current situation of massive accumulation of the phosphorus tailings cannot be fundamentally changed; third, the phosphorus tailings are prepared into calcium magnesium phosphate fertilizers through some technique means. The existing technologies include the following:

The Chinese Patent with a Publication No. CN101367673A discloses a method for directly preparing phosphor magnesium fertilizer with by-product mine tailings of phosphorus ore floatation; the preparation method comprises the following steps: taking flotation phosphate tailings slurry as the raw material, controlling the liquid water content to be between 40 percent and 45 percent, and directly mixing and reacting the slurry with mixture of sulfuric phosphoric acid at a temperature of 60° C. to 90° C. and a duration of 30 to 60 minutes to produce powdery or granular compound fertilizer. The Chinese Patent with a Publication No. CN101618981A discloses a method for producing phosphorus-magnesium compound fertilizer by using phosphate spoil-reclaiming byproduct high-magnesia tailing slag; the preparation method comprises the following steps in detail: taking dried and crushed phosphorus tailings as raw materials and directly mixing and reacting the phosphorus tailings with mixture of sulfuric phosphoric acid at a temperature of 50° C. to 80° C. and a duration of 35 to 55 minutes to produce powdery or granular compound fertilizer. The Chinese Patent with a Publication No. CN102161602A discloses a method for preparing phosphorus-magnesium compound fertilizer by utilizing raffinate and phosphate tailings with high magnesium content, comprising the following steps: drying and crushing 1,001 to 1,003 parts of phosphate tailings with high magnesium content which contains 4 to 7 mass percent of $P_2O_5$ and 15 to 19 mass percent of MgO, mixing and reacting with 700 to 1,300 parts of byproduct of the purification of wet-process phosphoric acid, namely the raffinate which contains 42 to 46 mass percent of $P_2O_5$ and 3 to 6 mass percent of MgO in a reactor, and adding 0.1002 to 1.002 parts of surfactant, wherein the reaction time is 10 to 20 min, and the reaction temperature is controlled to be between 40° C. and 60° C.; drying a fresh phosphorus-magnesium compound fertilizer obtained after the reaction at the temperature of 100±5° C.; and crushing and directly packaging to obtain a powdered phosphorus-magnesium compound fertilizer product.

The implementation of the above three patents can consume a certain amount of phosphorus tailings, and prepare a phosphorus-magnesium compound fertilizer, but the prepared products are mostly sulfates or phosphates, and available calcium, magnesium and phosphorus are less, and nutrient content is low. Thus the products take effects very slowly and have poor agronomic application effects.

Diammonium phosphate and monoammonium phosphate are binary quick-acting compound fertilizers, containing nitrogen and phosphorus, two essential nutrients for plant growth, and have been widely utilized as the main phosphate fertilizer for many years. However, there are several problems in the applications of monoammonium and diammonium, that is, the phosphorus and calcium, aluminium or iron are prone to form a delay state, and the effectiveness of phosphorus is reduced, resulting in a low utilization of phosphorus in the season when it is applied. In view of the problem that the phosphorus element in phosphorus-containing fertilizers is easily fixed by the soil, a form of polymerized phosphorus has been proposed in some patents. For example: the Chinese Patent with a Publication No. CN105481515A discloses a method for producing compound fertilizer containing poly-magnesium phosphate, comprising the following steps: (1) adding wet-process phosphoric acid and magnesium oxide powder into a reactor in proportion to react, to obtain a dilute magnesium biphosphate solution; (2) adding one or more of urea, ammonium nitrate, ammonium-calcium nitrate and nitrophosphate fertilizers into the dilute magnesium biphosphate solution, then heating and evaporating the mixture in an evaporator, to obtain a sizing agent; (3) producing the sizing agent to obtain a compound fertilizer containing poly-magnesium phosphate. However, this poly-magnesium phosphate compound fertilizer is produced by using wet-process phosphoric acid and magnesium oxide powder as raw materials, and the cost is relatively high. Moreover, this method only converts a small amount of orthophosphate into polyphosphate, resulting in a low conversion rate and a low magnesium content.

In summary, developing a fertilizer product that can make full use of the valuable elements in phosphorus tailings and contains sustained-release phosphorus with the phosphorus not easy to be fixed, as well as calcium and magnesium not easy to be leached and easy to be adsorbed by plants is important to economics and environmental protection.

SUMMARY

In view of the disadvantages of the prior art, the present disclosure provides a calcium magnesium polyphosphate fertilizer, a calcium magnesium polyphosphate fertilizer prepared by using wet-process phosphoric acid and phosphorus tailings as raw materials and the preparation method thereof, so as to solve the technical problems of environmental pollution resulting from massive accumulation of phosphorus tailings, and the low availability of phosphorus, calcium, magnesium in the phosphorus, calcium, and magnesium fertilizer prepared by using phosphorus tailings as raw materials in the prior art.

Terms Description

In the present disclosure, the term "available phosphorus", "available magnesium" and "available calcium" refer to phosphorus (based on $P_2O_5$), magnesium (based on MgO) and calcium (based on CaO) that can be extracted by EDTA (ethylenediaminetetraacetic acid) under an alkaline conditions of pH value ranging from 12 to 13. Taking phosphorus as an example, "available phosphorus" refers to soluble phosphorus and citric acid soluble phosphorus, and the total phosphorus includes not only the available phosphorus but also the insoluble phosphorus.

In the present disclosure, the term "polymerization rate" refers to the percentage of the difference value of the available phosphorus (based on $P_2O_5$) and the phosphorus in the form of ortho-phosphate radical (based on $P_2O_5$) to the available phosphorus (based on $P_2O_5$) in the product.

The present disclosure provides the following technical solutions.

Provided is a calcium magnesium polyphosphate fertilizer, wherein based on $P_2O_5$, MgO and CaO, the calcium magnesium polyphosphate fertilizer comprises 50% to 68% of total phosphorus, 47% to 66% of available phosphorus, 5% to 18% of total magnesium, 4% to 15% of available magnesium, 11% to 20% of total calcium, and 10% to 18% of available calcium, with all the values being expressed in mass percentage; and based on $P_2O_5$, a polymerization rate of the calcium magnesium polyphosphate fertilizer is ≥50%.

The calcium magnesium polyphosphate fertilizer provided in the present disclosure contains sustained-release phosphorus, and the phosphorus is not easy to be fixed, and calcium and magnesium are not easy to be leached and easy to be adsorbed by plants.

The calcium magnesium polyphosphate fertilizer provided in the embodiments of the present disclosure contains polyphosphate radical, and based on phosphorus pentoxide ($P_2O_5$), the polymerization rate of the calcium magnesium polyphosphate fertilizer is ≥50%, preferably ≥75%, for example, 55% to 90%.

In the embodiments of the present disclosure, the calcium magnesium polyphosphate fertilizer comprises 50% to 68% of total phosphorus, 47% to 66% of available phosphorus; more preferably, 55% to 65% of total phosphorus, 54% to 64% of available phosphorus. The calcium magnesium polyphosphate fertilizer comprises 5% to 18% of total magnesium, 4% to 15% of available magnesium; more preferably, 8% to 15% of total magnesium, 8% to 14% of available magnesium. The calcium magnesium polyphosphate fertilizer comprises 11% to 20% of total calcium, and 10% to 18% of available calcium; more preferably, 13% to 20% of total calcium, and 12% to 17% of available calcium. All the above values are expressed in percentage by mass, and calculated based on $P_2O_5$, magnesium oxide (MgO), and calcium oxide (CaO), respectively. In the calcium magnesium phosphate fertilizer in the embodiments of the present disclosure, the available contents of the phosphorus, calcium, magnesium are relatively high, which is beneficial for application.

In the embodiments of the present disclosure, the phosphorus in this product has a sustained-release property. That is, when the present product is applied into soil, the phosphorus in a polymeric state will not be quickly fixed but slowly release ortho-phosphate salts to meet the need of crops; at the same time, due to the effect of the polyphosphoric acid, magnesium and calcium will not be leached in large amounts by water, and thus the product is especially suitable for the crops requiring large amounts of calcium and magnesium.

A preferred embodiment of the present disclosure is shown as below.

Provided is a calcium magnesium polyphosphate fertilizer, wherein the fertilizer is prepared by using phosphorus tailings and phosphoric acid as raw materials; and based on $P_2O_5$, MgO and CaO, the calcium magnesium polyphosphate fertilizer comprises 50% to 68% of total phosphorus, 47% to 66% of available phosphorus, 5% to 18% of total magnesium, 4% to 15% of available magnesium, 11% to 20% of total calcium, and 10% to 18% of available calcium, with all the values being expressed in mass percentage; and based on $P_2O_5$, a polymerization rate of the calcium magnesium polyphosphate fertilizer is ≥50%.

The calcium magnesium polyphosphate fertilizer provided in the embodiments of the present disclosure contains sustained-release phosphorus, and the availability of the phosphorus, calcium, magnesium is relatively high, and the production cost is relatively low, and it can also solve the environmental pollution problem caused by massive accumulation of phosphorus tailings.

In the embodiments of the present disclosure, phosphorus tailings are used as one of the raw materials for preparing calcium magnesium polyphosphate fertilizer, wherein the phosphorus tailings are unutilized solid wastes that are discarded from floatation of concentrate in phosphate rocks. In accordance with the present disclosure, preferably, the phosphorus tailings comprise 4% to 8% by mass of phosphorus based on $P_2O_5$, and 15% to 19% by mass of magnesium based on MgO. The present disclosure takes advantage of the high content of calcium and magnesium in the phosphorus tailings, and makes full use of the two elements.

In the embodiments of the present disclosure, another raw material for preparation of the calcium magnesium polyphosphate fertilizer is phosphoric acid, wherein the phosphoric acid is preferably wet-process phosphoric acid. The wet-process phosphoric acid comprises phosphoric acid as its component, and also comprises a small amount of other impurity ions. The wet-process phosphoric acid comprises 15% to 46% by mass of phosphorus based on $P_2O_5$, preferably 20% to 30%, more preferably 22% to 26%.

In the embodiments of the present disclosure, the calcium magnesium polyphosphate fertilizer comprises 55% to 65% of total phosphorus, 54% to 64% of available phosphorus, 8% to 15% of total magnesium, 8% to 14% of available magnesium, 13% to 20% of total calcium, and 12% to 17% of available calcium, with all the values being expressed in mass percentage; and a polymerization rate of the calcium magnesium polyphosphate fertilizer is ≥75%.

Correspondingly, provided is a method for preparing calcium magnesium polyphosphate fertilizers by using wet-process phosphoric acid and phosphorus tailings as raw materials, comprising the following steps:

(1) mixing and reacting the phosphorus tailings and the phosphoric acid at room temperature, to obtain a reaction mixture; and (2) subjecting the reaction mixture to a calcination reaction at a temperature of 200° C. to 600° C. and quenching the reaction when the polymerization rate of phosphoric acid, based on $P_2O_5$, reaches ≥50%, and then grinding the resulting product into powder to obtain the calcium magnesium polyphosphate fertilizer; or subjecting the reaction mixture to a polymerization reaction under the action of hot air at a high temperature of 200° C. to 600° C. and quenching the reaction when the polymerization rate of phosphoric acid, based on $P_2O_5$, reaches ≥50%, and then grinding the resulting product into powder to obtain the calcium magnesium polyphosphate fertilizer.

In the embodiments of the present disclosure, the phosphorus tailings and the phosphoric acid are mixed and reacted in a reactor at room temperature. In accordance with the method of the present disclosure, preferably, the phosphorus tailings in step (1) comprise 4% to 8% by mass of phosphorus based on $P_2O_5$, 13% to 19% by mass of magnesium based on MgO, and 28% to 38% by mass of calcium based on CaO.

In addition, the phosphoric acid is preferably wet-process phosphoric acid, ; and the wet-process phosphoric acid comprises 15% to 40% by mass of phosphorus based on $P_2O_5$, preferably 20% to 30%.

Preferably, in step (1), the phosphorus tailings and the phosphoric acid are added in such a ratio that the molar ratio of $P_2O_5$: (CaO+MgO) in the reaction mixture is from 1:1.2 to 1:1.8. More preferably, the phosphorus tailings and the phosphoric acid are added in such a ratio that the molar ratio of $P_2O_5$: (CaO+MgO) in the reaction mixture is from 1:1.25 to 1:1.45.

In the preparation method of the present disclosure, it is necessary to strictly control the mixing ratio of the phosphorus tailings to the phosphoric acid in the system. When in the mixture of phosphorus tailings and phosphoric acid, the molar ratio of $P_2O_5$: (CaO+MgO) is less than 1:1.8, that is, when the phosphorus tailings are excessive, the extraction efficiency of the phosphoric acid to the phosphorus, calcium and magnesium in the phosphorus tailings will decrease. Moreover, excessive phosphorus tailings will reduce the content of the available nutrient in the final product, and reduce the polymerization efficiency. When in the mixture of phosphorus tailings and phosphoric acid, the molar ratio of $P_2O_5$: (CaO+MgO) is more than 1:1.2, that is, when the phosphoric acid is excessive, the quality of the final product will be reduced, the viscosity will increase, and the marketability of the produce will decrease.

In accordance with the preparation method of the present disclosure, preferably, a duration of mixing and reacting the phosphorus tailings and the phosphoric acid at room temperature in step (1) is 1-3 h, more preferably from 1 h-2.5 h.

In accordance with examples of the present disclosure, before the calcination reaction, the obtained reaction mixture is preferably concentrated to obtain a concentrated liquid. In accordance with the preparation method of the present disclosure, preferably, in step (2), before the calcination reaction, the reaction mixture is concentrated at a temperature of 60° C. to 100° C. and a pressure of 10 kPa to 90 kPa until a mass percentage of water in the slurry is 35% to 45%. Besides, the above concentrated liquid may be concentrated and polymerized under the action of hot air, to obtain the calcium magnesium polyphosphate fertilizer.

In accordance with the preparation method of the present disclosure, preferably, the temperature during the calcination reaction in step (2) is from 350° C. to 450° C. In the embodiments of the present disclosure, the calcination reaction is quenched when the polymerization rate of the phosphoric acid, based on $P_2O_5$, reaches ≥50%, preferably ≥75%. In the embodiments of the present disclosure, the product resulting from the calcination reaction can be grinded into powder, to obtain the calcium magnesium polyphosphate fertilizer.

In accordance with the preparation method of the present disclosure, when the temperature is lower than 200° C., the polymerization rate of the product will be greatly reduced; and when the temperature is higher than 600° C., the polymerized phosphorus of the phosphoric acid in the product will grow slowly, and the energy consumption and production cost will increase, and the difficulty for the production control will increase.

In the present disclosure, when the temperature is controlled at 350° C. to 450° C., the polymerization rate can reach ≥75%.

Compared with the prior art, the embodiment of the present disclosure has the following beneficial effects.

It can be seen from the above technical solutions that the final product can be obtained by directly mixing and reacting phosphoric acid and phosphorus tailings as raw materials and then performing a polymerization at high temperature. The product in the present disclosure has a high content of available phosphorus, available calcium and available magnesium, wherein the product comprises 50% to 68% of total phosphorus, 47% to 66% of available phosphorus, 5% to 18% of total magnesium, 4% to 15% of available magnesium, 11% to 20% of total calcium and 10% to 18% of available calcium, with all the values being expressed in mass percentage; and based on $P_2O_5$, a polymerization rate of the calcium magnesium polyphosphate fertilizer is ≥50%. In addition, the polymerized phosphorus, polymerized calcium, and polymerized magnesium in the product prepared in the present disclosure have a sustained-release property. When the present product is applied into soil, the calcium magnesium polyphosphate therein is not fixed quickly, but instead slowly releases calcium and magnesium in the form of orthophosphate as required by the crop, which enhances the absorption and utilization rate of phosphorus, calcium and magnesium; at the same time, due to the action of the polyphosphate, the magnesium and calcium will not readily be massively leached by water.

The present invention can convert phosphoric acid and phosphorus tailings into a fertilizer, eradicate the pollution problem of phosphorous tailings slag and change them into valuable materials, but also provide an effective way to enhance the comprehensive utilization of resources. The present invention has an significantly practical significance for ensuring agricultural development and sustainable development of phosphorus chemical industry. Further, the present invention has advantages of broad resources of the raw materials, low energy consumption, simple production procedure, reliable product quality and good effect.

DETAILED DESCRIPTION

The present disclosure is further described below through specific examples, but not limited herein.

In the examples, all "%" refers to percentage by mass.

EXAMPLES

Example 1

Provided is a method for preparing calcium magnesium polyphosphate fertilizers by using wet-process phosphoric acid and phosphorus tailings, wherein the used raw materials have the following characteristics:
   wet-process phosphoric acid: w($P_2O_5$) 23.39%, w(MgO) 1.01%, w(CaO) 0.12%;
   phosphorus tailings: w($P_2O_5$) 7.07%, w(MgO) 16.2%, w(CaO) 35.11%.
The method comprises the following steps:
   (1) mixing and reacting 100 kg of the phosphorus tailings and 400 kg of the wet-process phosphoric acid in a reactor at room temperature for 1.5 hours, to obtain a reaction mixture;
   (2) calcining the obtained reaction mixture at a temperature of 350° C. for 3.5 hours, and then grinding into powder to obtain a calcium magnesium polyphosphate product.
The analysis results of the product are showed in the following table:

| Total $P_2O_5$ | Available $P_2O_5$ | Total MgO | Available MgO | Total CaO | Available CaO | Polymerization rate | pH (1%) |
|---|---|---|---|---|---|---|---|
| 58.66% | 57.74% | 11.73% | 10.98% | 18.87% | 15.51% | 80.54% | 4.3 |

Example 2

Provided is a method for preparing calcium magnesium polyphosphate fertilizers by using wet-process phosphoric acid and phosphorus tailings, wherein the used raw materials have the following characteristics:
   wet-process phosphoric acid: w($P_2O_5$) 22.39%, w(MgO) 1.23%, w(CaO) 0.15%;
   phosphorus tailings: w($P_2O_5$) 6.18%, w(MgO) 15.23%, w(CaO) 34.32%.
The method comprises the following steps:
   (1) mixing and reacting 100 kg of the phosphorus tailings and 520 kg of the phosphoric acid in a reactor at room temperature for 2 hours, to obtain a reaction mixture;
   (2) concentrating the obtained reaction mixture at a temperature of 80° C. and a pressure of 30 kPa, to obtain a concentrated liquid having 44% to 45% by mass of water in the slurry;
   (3) calcining the obtained concentrated liquid at a temperature of 450° C. for 3 hours, and then grinding into powder to obtain a calcium magnesium polyphosphate product.
The analysis results of the product are shown in the following table:

| Total $P_2O_5$ | Available $P_2O_5$ | Total MgO | Available MgO | Total CaO | Available CaO | Polymerization rate | pH(1%) |
|---|---|---|---|---|---|---|---|
| 63.50% | 63.13% | 9.94% | 9.4% | 16.37% | 15.94% | 85.12% | 3.1 |

Example 3

Provided is a method for preparing calcium magnesium polyphosphate fertilizers by using wet-process phosphoric acid and phosphorus tailings, wherein the used raw materials have the following characteristics:

wet-process phosphoric acid: $w(P_2O_5)$ 22.39%, $w(MgO)$ 1.33%, $w(CaO)$ 0.19%;

phosphorus tailings: $w(P_2O_5)$ 7.02%, $w(MgO)$ 17.23%, $w(CaO)$ 33.35%.

The method comprises the following steps:
(1) mixing and reacting 100 kg of the phosphorus tailings and 580 kg of the phosphoric acid in a reactor at room temperature for 1 h, to obtain a reaction mixture;
(2) concentrating the obtained reaction mixture at a temperature of 90° C. and a pressure of 30 kPa, to obtain a concentrated liquid having 35% to 36% by mass of water in the slurry;
(3) calcining the obtained concentrated liquid at a temperature of 600° C. for 2 hours, and then grinding into powder to obtain a calcium magnesium polyphosphate product.

The analysis results of the product are shown in the following table:

| Total $P_2O_5$ | Available $P_2O_5$ | Total MgO | Available MgO | Total CaO | Available CaO | Polymerization rate | pH(1%) |
|---|---|---|---|---|---|---|---|
| 64.12% | 51.65% | 9.25% | 7.01% | 16.52% | 10.17% | 83.2% | 5.4 |

Example 4

Provided is a method for preparing calcium magnesium polyphosphate fertilizers by using wet-process phosphoric acid and phosphorus tailings, wherein the used raw materials have the following characteristics:

wet-process phosphoric acid: $w(P_2O_5)$ 22.39%, $w(MgO)$ 1.33%, $w(CaO)$ 0.19%;

phosphorus tailings: $w(P_2O_5)$ 5.02%, $w(MgO)$ 17.03%, $w(CaO)$ 32.15%;

The method comprises the following steps:
(1) mixing and reacting 100 kg of the phosphorus tailings and 500 kg of the phosphoric acid in a reactor at room temperature for 1 h, to obtain a reaction mixture;
(2) concentrating the obtained reaction mixture at a temperature of 90° C. and a pressure of 30 kPa, to obtain a concentrated liquid having 35% to 36% by mass of water in the slurry;
(3) calcining the obtained concentrated liquid at a temperature of 200° C. for 4 hours, and then grinding into powder to obtain a calcium magnesium polyphosphate product.

The analysis results of the product are shown in the following table.

| Total $P_2O_5$ | Available $P_2O_5$ | Total MgO | Available MgO | Total CaO | Available CaO | Polymerization rate | pH(1%) |
|---|---|---|---|---|---|---|---|
| 55.23% | 54.44% | 11.78% | 11.18% | 15.86% | 15.06% | 57.96 | 2.85 |

Example 5

Provided is a method for preparing calcium magnesium polyphosphate fertilizers by using wet-process phosphoric acid and phosphorus tailings, wherein the used raw materials have the following characteristics:

wet-process phosphoric acid: $w(P_2O_5)$ 25.41%, $w(MgO)$ 1.41%, $w(CaO)$ 0.23%;

phosphorus tailings: $w(P_2O_5)$ 5.91%, $w(MgO)$ 18.33%, $w(CaO)$ 31.35%;

The method comprises the following steps:
(1) mixing and reacting 100 kg of the phosphorus tailings and 500 kg of the phosphoric acid in a reactor at room temperature for 1.5 h, to obtain a reaction mixture; and
(2) pumping the above reaction mixture into a top of a spray tower and spraying it out, then introducing hot air at 450° C. into the spray tower, and under the effect of the hot air, concentrating and polymerizing the reaction mixture, to obtain a calcium magnesium polyphosphate product.

The analysis results of the product are shown in the following table:

| Total $P_2O_5$ | Available $P_2O_5$ | Total MgO | Available MgO | Total CaO | Available CaO | Polymerization rate | pH(1%) |
|---|---|---|---|---|---|---|---|
| 60.02% | 59.54% | 13.22% | 12.31% | 17.51% | 16.17% | 80.13 | 4.5 |

Example 6

Provided is method for preparing calcium magnesium polyphosphate fertilizers by using wet-process phosphoric acid and phosphorus tailings, wherein the used raw materials have the following characteristics:

wet-process phosphoric acid: w($P_2O_5$) 22.39%, w(MgO) 1.33%, w(CaO) 0.19%;

phosphorus tailings: w($P_2O_5$) 5.91%, w(MgO) 18.33%, w(CaO) 31.35%;

The method comprises the following steps:
(1) mixing and reacting 100 kg of the phosphorus tailings and 500 kg of the phosphoric acid in a reactor at room temperature for 2 h, to obtain a reaction mixture;
(2) concentrating the obtained reaction mixture at a temperature of 90° C. and a pressure of 30 kPa, to obtain a concentrated liquid having 35% to 36% by mass of water in the slurry;
(3) calcining the obtained concentrated liquid at a temperature of 250° C. for 5 hours, and then grinding into powder to obtain a calcium magnesium polyphosphate product.

The analysis results of the product are shown in the following table.

| Total $P_2O_5$ | Available $P_2O_5$ | Total MgO | Available MgO | Total CaO | Available CaO | Polymerization rate | pH(1%) |
|---|---|---|---|---|---|---|---|
| 58.33% | 57.95% | 12.65% | 11.16% | 17.79% | 17.10% | 65.39 | 3.6 |

Comparative Example 1

The raw materials and the method are the same as in Example 1, except that the amount of the wet-process phosphoric acid in step (1) was changed to 350 kg.

The analysis results of the product are shown in the following table:

| Total $P_2O_5$ | Available $P_2O_5$ | Total MgO | Available MgO | Total CaO | Available CaO | Polymerization rate | pH(1%) |
|---|---|---|---|---|---|---|---|
| 52.78% | 48.23% | 12.36% | 8.12% | 19.23% | 15.11% | 70.54% | 4.6 |

Comparative Example 2

The raw materials and the method are the same as in Example 1, except that the temperature during the reaction in step (2) was changed to 150° C.

The analysis results of the product are shown in the following table:

| Total $P_2O_5$ | Available $P_2O_5$ | Total MgO | Available MgO | Total CaO | Available CaO | Polymerization rate | pH(1%) |
|---|---|---|---|---|---|---|---|
| 48.46% | 45.95% | 10.56% | 7.25% | 16.42% | 13.89% | 35.34% | 4.1 |

Comparative Example 3

The raw materials and the method are the same as in Example 3, except that the amount of the wet-process phosphoric acid in step (1) was changed to 650 kg.

The analysis results of the product are shown in the following table:

| Total $P_2O_5$ | Available $P_2O_5$ | Total MgO | Available MgO | Total CaO | Available CaO | Polymerization rate | pH(1%) |
|---|---|---|---|---|---|---|---|
| 64.51% | 52.23% | 10.23% | 8.22% | 16.71% | 11.25% | 85% | 5.0 |

Due to excessive amount of phosphoric acid, the materials in the preparation process of the product obtained in this Comparative Example have an increased viscosity, resulting in a limited production and poor marketability.

Test Example

Raw materials: urea (N 46%), potassium nitrate (N 13.5%, $K_2O$ 46%), monoammonium phosphate (N 11%, $P_2O_5$ 49%), calcium nitrate (N 11%, CaO 23%), magnesium sulfate heptahydrate (MgO 16%), ammonium polyphosphate (11-44-0) and water-soluble fertilizers (16-8-34) are all commercially available.

Date and location for the test: the test was carried out in December, 2016 in a watermelon greenhouse in Fei Country, Linyi City, Shandong Province.

The treatments in the test were as follow.

Treatment 1: 18.5 kg of monoammonium phosphate, 16 kg of urea, 16 kg of potassium nitrate, 10 kg of calcium nitrate, and 8.8 kg of magnesium sulfate heptahydrate were applied as base fertilizers, and when the watermelon at the fruit enlargement stage grew as big as an egg, 5 kg of water-soluble fertilizers (16-8-34) was applied with irrigation, and another 5 kg of water-soluble fertilizers (16-8-34) was applied with irrigation again after 10 days.

Treatment 2: 14 kg of the calcium magnesium polyphosphate obtained in Example 2, 16 kg of urea, and 16 kg of potassium nitrate were applied as base fertilizers, and when the watermelon at the fruit enlargement stage grew as big as an egg, 5 kg of water-soluble fertilizers (16-8-34) was applied with irrigation, and another 5 kg of water-soluble fertilizers (16-8-34) was applied with irrigation again after 10 days.

Treatment 3: 20 kg of calcium magnesium polyphosphate product obtained in Comparative Example 2, 16 kg of urea, and 16 kg of potassium nitrate were applied as base fertilizers, and when the watermelon at the fruit enlargement stage grew as big as an egg, 5 kg of water-soluble fertilizers (16-8-34) was applied with irrigation, and another 5 kg of water-soluble fertilizers (16-8-34) was applied with irrigation again after 10 days.

Treatment 4: 19 kg of ammonium polyphosphate (11-44-0), 16kg of urea , 16 kg of potassium nitrate , 10 kg of calcium nitrate , and 8.8 kg of magnesium sulfate heptahydrate were applied as base fertilizers, and when the watermelon at the fruit enlargement stage grew as big as an egg, 5 kg of water-soluble fertilizers (16-8-34) was applied with irrigation, and another 5 kg of water-soluble fertilizers (16-8-34) was applied with irrigation again after 10 days.

There were 3 replicate groups for each treatment, and the average value was calculated. Only the first crop of watermelon was calculated. The results are shown as following.

TABLE 1

Effects of different fertilization treatments on watermelon in greenhouse

| Fertilizer type | Spad | Soluble solid materials (g) | Yield per mu (Kg) | Increased production ratio (%) |
|---|---|---|---|---|
| Treatment 1 | 68.6 | 9.5% | 2320 | — |
| Treatment 2 | 72.1 | 10.3% | 2695 | 16.2% |
| Treatment 3 | 69.0 | 10.1% | 2425 | 4.5% |
| Treatment 4 | 69.7 | 9.6% | 2489 | 7.3% |

As can be clearly seen from Table 1, the products in the present disclosure had effects of markedly improving quality and increasing production. In addition, although the amount of available phosphorus applied in treatment 3 is the same as that in treatment 2, due to the polymerization rate of phosphorus in Treatment 3 is lower, the increased production in Treatment 3 is reduced by 11.7% as compared with that Treatment 2. The term of "Spad" in Table 2 represents the measured value of chlorophyll.

In addition, the application of ammonium polyphosphate instead of monoammonium phosphate in Treatment 4 can increase the yield by 7.3% as compared with that in Treatment 1, but it is still 8.9% less than that in Treatment 2, indicating that ammonium polyphosphate plus calcium fertilizer and magnesium fertilizer are difficult to achieve the same effect of calcium magnesium polyphosphate of the present invention The above examples are merely the preferred embodiments of the present disclosure, and are not intended to limit the present invention in any form. Moreover, anything that does not departed from the technical solutions of the present disclosure, including any simple amendments and equivalent variations as well as modifications of the above examples in accordance with the technical essence of the present disclosure, should fall within the scope of technical solutions of the present disclosure.

The invention claimed is:

1. A method for preparing a calcium magnesium polyphosphate fertilizer by using wet-process phosphoric acid and phosphorus tailings as raw materials, comprising the following steps:
    (1) mixing and reacting the phosphorus tailings and the phosphoric acid at room temperature, to obtain a reaction mixture; and
    (2) at a high temperature of 200° C. to 600° C., subjecting the reaction mixture to a calcination reaction or a polymerization reaction under the action of hot air, and quenching the reaction when a polymerization rate of the phosphoric acid, based on $P_2O_5$, reaches ≥50%, to obtain the calcium magnesium polyphosphate fertilizer;
    wherein based on $P_2O_5$, MgO and CaO, the calcium magnesium polyphosphate fertilizer comprises 55%-65% of total phosphorus, 54%-64% of available phosphorus, 8% to 15% of total magnesium, 8% to 14% of available magnesium, 13% to 20% of total calcium, and 12% to 17% of available calcium, with all the values being expressed in mass percentage;
    wherein "available phosphorus", "available magnesium" and "available calcium" refer to phosphorus (based on $P_2O_5$), magnesium (based on MgO) and calcium (based on CaO) that can be extracted by ethylenediaminetetraacetic acid under an alkaline conditions of pH value ranging from 12 to 13.

2. The method according to claim 1, wherein a duration of mixing and reacting the phosphorus tailings and the phosphoric acid at room temperature in step (1) is 1-3 h.

3. The method according to claim 1, wherein the phosphorus tailings in step (1) comprise 4% to 8% by mass of phosphorus based on $P_2O_5$, 15% to 19% by mass of magnesium based on MgO, and 28% to 38% by mass of calcium based on CaO.

4. The method according to claim 1, wherein in step (1), the phosphorus tailings and the phosphoric acid are added in a ratio such that the molar ratio of $P_2O_5$: (CaO+MgO) in the reaction mixture is from 1:1.2 to 1:1.8.

5. The method according to claim 4, wherein in step (1), the phosphorus tailings and the phosphoric acid are added in a ratio such that the molar ratio of $P_2O_5$: (CaO+MgO) in the reaction mixture is from 1:1.25 to 1:1.45.

6. The method according to claim 1, wherein in step (2), the calcination reaction is performed in a temperature of 350° C. to 450° C.

7. The method according to claim 1, wherein in step (2), before the calcination reaction, the reaction mixture is concentrated at a temperature of 60° C. to 100° C. and a pressure of 10 kPa to 90 kPa until a mass percentage of water in the reaction mixture is 35% to 45%.

* * * * *